(12) United States Patent
Zhao et al.

(10) Patent No.: US 12,403,612 B2
(45) Date of Patent: Sep. 2, 2025

(54) ROBOT-MOUNTED LAMP ASSEMBLY FOR CURING PAINT

(71) Applicant: GM GLOBAL TECHNOLOGY OPERATIONS LLC, Detroit, MI (US)

(72) Inventors: Xiang Zhao, Novi, MI (US); Hua-tzu Fan, Troy, MI (US); John Patrick Spicer, Plymouth, MI (US); Marcel James Isrow, Sterling Heights, MI (US); Lisa M. Albaugh, Frankfort, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 18/095,423

(22) Filed: Jan. 10, 2023

(65) Prior Publication Data

US 2024/0227198 A1    Jul. 11, 2024

(51) Int. Cl.
| | |
|---|---|
| *B25J 11/00* | (2006.01) |
| *B05D 3/06* | (2006.01) |
| *B25J 9/16* | (2006.01) |
| *B25J 15/00* | (2006.01) |

(52) U.S. Cl.
CPC ........... *B25J 11/0075* (2013.01); *B05D 3/067* (2013.01); *B25J 9/1684* (2013.01); *B25J 15/0019* (2013.01); *B25J 15/0066* (2013.01)

(58) Field of Classification Search
CPC .. B25J 11/0075; B25J 9/1684; B25J 15/0019; B25J 15/0066; B25J 9/00; B25J 9/16; B25J 9/0096; B25J 9/02; B25J 9/023; B05D 3/067
See application file for complete search history.

(56) References Cited

U.S. PATENT DOCUMENTS

| | | | |
|---|---|---|---|
| 11,537,097 B2 * | 12/2022 | Shapiro | G05B 19/18 |
| 2012/0152877 A1 * | 6/2012 | Tadayon | F24S 40/90 901/30 |
| 2014/0063096 A1 * | 3/2014 | Pitz | B41J 11/002 347/9 |
| 2019/0031558 A1 * | 1/2019 | Torfs | C03C 17/32 |
| 2019/0170694 A1 * | 6/2019 | Xiong | B23K 31/125 |
| 2024/0408895 A1 * | 12/2024 | Lee | B41J 11/00214 |

FOREIGN PATENT DOCUMENTS

JP    2020168312 A   * 10/2020

OTHER PUBLICATIONS

Luo et al., "WO 2021022590 A1," Feb. 11, 2021 (Year: 2021).*

* cited by examiner

*Primary Examiner* — Adam R Mott
*Assistant Examiner* — Byron Xavier Kasper

(57) ABSTRACT

A robotic system is provided. The robot system includes a robot arm, a lamp assembly, and a control module. The robot arm includes a first end and a second end that opposes the first end. The lamp assembly is disposed at the second end of the robot arm and includes at least one ultraviolet (UV) light that is configured to cure paint on a panel of a vehicle. The control module is configured to actuate the robot arm and position the lamp assembly relative to the panel of the vehicle.

9 Claims, 4 Drawing Sheets

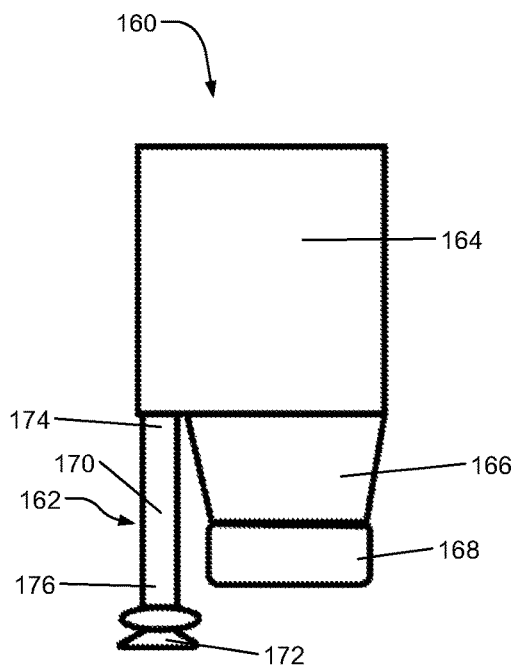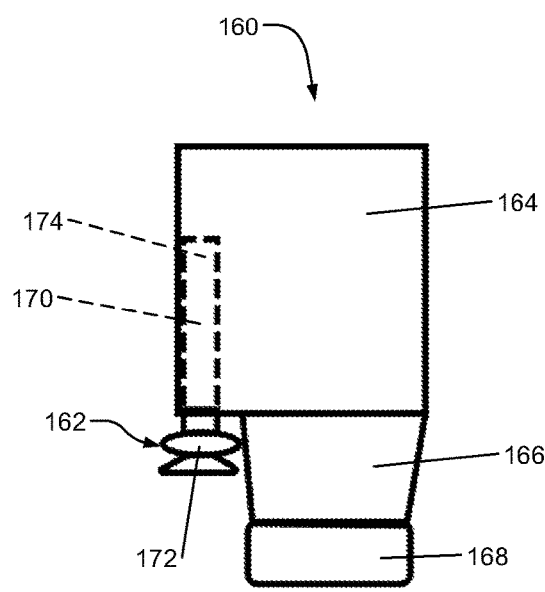
FIG. 5  FIG. 6
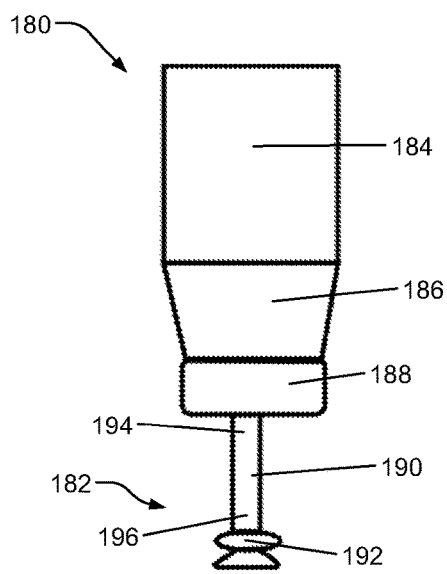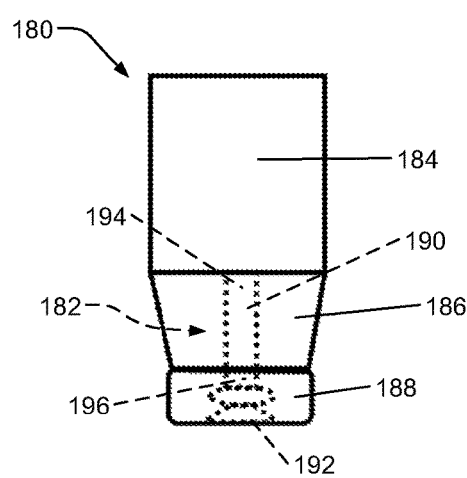
FIG. 7  FIG. 8

ROBOT-MOUNTED LAMP ASSEMBLY FOR CURING PAINT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to painting, and more particularly to a robot-mounted lamp assembly for curing paint.

During manufacture of a vehicle, paint may be applied to panels of the vehicle. More specifically, paint may be applied to an exterior surface and an interior surface of the panel. Examples of such panels include a door frame, a fuel door, and a liftgate of the vehicle. Various types of paint may be used. One type of paint is curable paint.

SUMMARY

An example robotic system includes a robot arm, a lamp assembly, and a control module. The robot arm includes a first end and a second end that opposes the first end. The lamp assembly is disposed at the second end of the robot arm and includes at least one ultraviolet (UV) light that is configured to cure paint on a panel of a vehicle. The control module is configured to actuate the robot arm and position the lamp assembly relative to the panel of the vehicle, and selectively turn on and off the at least one UV light.

In one example, the at least one UV light includes at least one UV light emitting diode (LED) light.

In one example, the at least one UV light includes a plurality of UV lights.

In one example, each of the plurality of UV lights have the same light output wavelength.

In one example, the plurality of UV lights includes at least two of a UV-A light, a UV-B light, and a UV-C light.

In one example, an end effector is attached to the lamp assembly and operable to move a panel of the vehicle between a first position and a second position.

In one example, the end effector is movable between an extended position and a retracted position.

In one example, the end effector is disposed beside the at least one UV light.

In one example, the at least one UV light includes a plurality of UV lights and the end effector is disposed radially inwardly of the plurality of UV lights.

In one example, the lamp assembly includes a paint applicator.

In one example, the at least one UV light includes a plurality of UV lights and the paint applicator is disposed radially inwardly of the plurality of UV lights.

An example robotic system includes a robot arm, a paint applicator, a rail, a lamp assembly, and a control module. The robot arm includes a first end and a second end that opposes the first end. The paint applicator is disposed at the second end of the robot arm and is configured to output paint onto a panel of a vehicle. The rail is attached to the paint applicator and extends away from the paint applicator. The lamp assembly is configured to slide along the rail and includes at least one UV light operable to cure paint on the panel of the vehicle. The control module is configured to actuate the robot arm and position the paint applicator relative to the panel of the vehicle and position the lamp assembly relative to the panel of the vehicle.

In one example, the control module is configured to slide the lamp assembly along the rail.

In one example, the control module is configured to pivot the lamp assembly relative to the rail.

In one example, the control module is configured to selectively move the lamp assembly toward the rail and away from the rail.

In one example, the lamp assembly includes a distance sensor configured to measure a distance between the lamp assembly and the panel of the vehicle.

In one example, the control module is configured to move the lamp assembly one of toward the rail and away from the rail based on the distance measured by the distance sensor.

In one example, the lamp assembly includes a lamp cover disposed annularly around the at least one UV light.

In one example, the at least one UV light includes a plurality of UV lights having a same wavelength.

In one example, the at least one UV light includes a plurality of UV lights having more than one different wavelength.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a side view of an example lamp assembly and an example end effector in an extended position;

FIG. 6 is a side view of the example lamp assembly shown in FIG. 5 and the example end effector in a retracted position;

FIG. 7 is a side view of an example lamp assembly and an example end effector in an extended position;

FIG. 8 is a side view of the example lamp assembly shown in FIG. 7 and the example end effector in a retracted position;

DETAILED DESCRIPTION

Panels of a vehicle may be painted and cured during a production process of the vehicle. Examples of such panels include interior panels of the vehicle and exterior panels of the vehicle. In one example, the panels may be cured using a cure oven after the panel is painted. While the panels are disposed within the cure oven, the cure oven is configured to raise a temperature of the panels to a target temperature for a target duration of time. In one example, the target temperature may be about 250 degrees Fahrenheit (° F.) and the target duration of time may be about 30 minutes. However, use of the cure oven requires consumption of energy such as natural gas or electricity, which is costly and increases a carbon footprint of the production process of the vehicle.

In another example, the panels of the vehicle may be cured using an ultraviolet (UV) lamp that is stationary. The UV lamp may apply UV light onto the panel for about 2 minutes. Compared against using cure ovens, the panels may be cured in less time and less energy is consumed using the UV lamp.

However, the UV lamp may not cure some portions of the panels because of a poor line of sight between the UV lamp and such portions of the panels. In one example, the poor line of sight may be created by the positioning and geometry of the panel in relation to the UV lamp. Hence, such portions of the panels may be left uncured.

Figure 1:
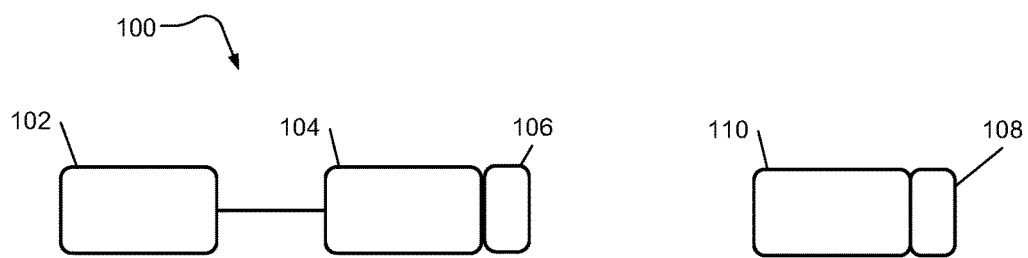
FIG. 1 is a functional block diagram of an example robotic system and an example vehicle.

In light of the above, the present application involves a robotic system and a robot-mounted lamp assembly for curing paint using light. FIG. 1 is a functional block diagram of an example robotic system and example vehicle.

With reference to FIG. 1, a robotic system 100 includes a control module 102, a robot 104 and a lamp assembly 106. The lamp assembly 106 is mounted to the robot 104 and may include UV lights. In one example, the UV lights may include UV light emitting diode (LED) lights. The control module 102 is configured to operate the robot 104 and the lamp assembly 106. For example, the control module 102 is configured to move the robot 104 to a location of a selected panel 108 of a vehicle 110. The panel 108 of the vehicle 110 may be an interior panel of the vehicle 110 or an exterior panel of the vehicle 110 or another suitable panel. The panel 108 may be a swinging panel that is movable between an open position and a closed position, such as a liftgate, door, or hood. The present application is also applicable to non-swinging (e.g., fixed) panels and non-vehicle panels.

After the panel 108 of the vehicle 110 is painted using curable paint (e.g., UV curable paint), the control module 102 is configured to turn on the UV lights of the lamp assembly 106. The control module 102 is configured to move the robot 104 such that the UV lights may reach all target areas of the selected panel 108. The robot 104 may have a suitable number of degrees of freedom (DOF), such as 6 DOF or higher. The control module 102 controls a frequency of the UV lights, an intensity of the UV lights, and a duration of time that the UV lights will on and output light to the panel 108.

Figure 2:
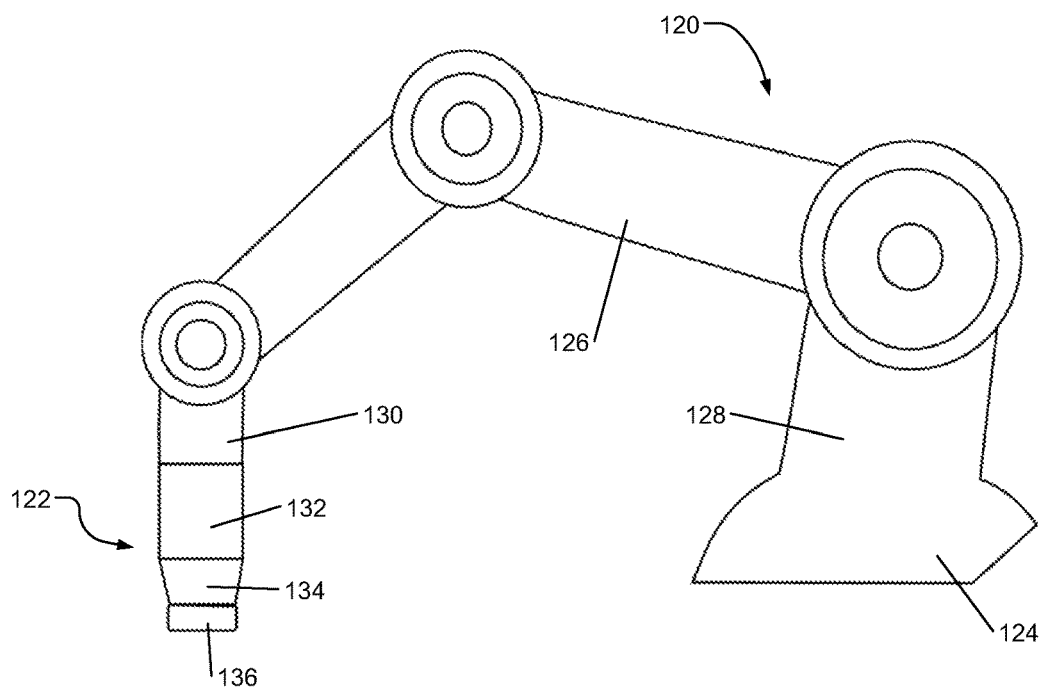
FIG. 2 is a side view of an example robot and an example lamp assembly.
Figures 3, 4:
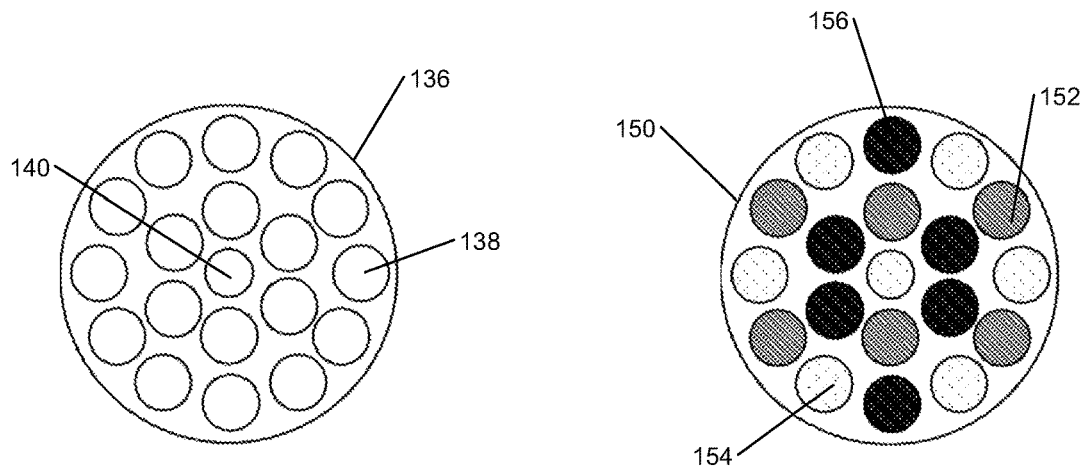
FIG. 3 is a bottom view of UV lights of the example lamp assembly.
FIG. 4 is a bottom view of UV lights of another example lamp assembly.

FIG. 2 is a side view of an example robot 120 and an example lamp assembly 122. FIG. 3 is a bottom view of the example lamp assembly 122.

The robot 120 may include a base 124 and a robot arm 126. The base 124 may be positioned on a floor surface of a vehicle manufacturing plant, or alternatively on a stand or in another suitable location. The robot arm 126 extends between a first end 128 and a second end 130 that opposes the first end 128. The first end 128 of the robot arm 126 may be attached to the base 124. The second end 130 of the robot arm 126 may be attached to the lamp assembly 122.

The lamp assembly 122 may include a first portion 132, a second portion 134, and a lamp housing 136. The first portion 132 may be directly attached to the second end 130 of the robot arm 126. The second portion 134 may be disposed between the first portion 132 and the lamp housing 136.

As shown in FIG. 3, the lamp housing 136 may include UV lights 138. The UV lights 138 may be UV light emitting diode (LED) lights. In the illustrated example, the lamp housing 136 may be formed in a cylindrical shape. However, the lamp housing may be formed in another suitable shape, such as square, rectangular, or triangular.

The UV lights 138 may be arranged in a pattern. In the illustrated example, a first set of UV lights 138 may be positioned along an outer diameter of the lamp housing 136. A second set of UV lights 138 may be positioned radially inwardly of the first set of UV lights 138. One or more UV lights 138 may be disposed radially inwardly of the second set of UV lights 138, such as at a center 140 of the lamp housing 136. However, the UV lights 138 may be arranged in another suitable pattern.

In the illustrated example, the UV lights 138 include 19 UV lights. However, the UV lights 138 may include another suitable number of UV lights 138. Each of the UV lights 138 may have the same output light wavelength or frequency. For example, each of the UV lights 138 may be UV-A lights. UV-A lights may have a wavelength ranging from about 315 nanometers (nm) to about 400 nm. In another example, each of the UV lights 138 may be UV-B lights. UV-B lights may have a wavelength ranging from about 280 nm to about 315 nm. In yet another example, each of the UV lights 138 may be UV-C lights. UV-C lights may have a wavelength ranging from about 100 nm to about 280 nm. In various implementations, the UV lights 138 may include a combination of two or more of UV-A, UV-B, and UV-C lights. The different UV light wavelengths may be used to cure different types of paint. For example, a primer may be cured using UV-C lights, while another paint may be cured using UV-A and/or UV-B lights.

In some configurations of the lamp housing, a lamp housing may include UV lights having different wavelengths. FIG. 4 is a bottom view of an example lamp housing 150.

The UV lights may include UV-A lights 152, UV-B lights 154, and UV-C lights 156, or a combination thereof. The control module 102 is configured to selectively turn on ones or sets of UV lights 152, 154, 156 based on the paint applied. In the illustrated example, the lamp housing 150 includes six UV-A lights 152, seven UV-B lights 154, and six UV-C lights 156. However, the lamp housing 150 may include another suitable number of UV-A, UV-B and UV-C lights 152, 154, 156, and the UV-A, UV-B, and UV-C lights 152, 154, 156 may be arranged in another suitable pattern. In one example, the lamp housing 150 may also include infrared (IR) lights. The control module 102 is configured to selectively turn on one or more of the IR lights to cure the paint, such as when heat is required.

In some configurations of the lamp assembly, a lamp assembly 160 may include an end effector 162. The end effector 162 is movable to an extended position, to a retracted position, and to positions between the extended and retracted positions. FIG. 5 is a side view of the example lamp assembly 160 with the example end effector 162 in the extended position. FIG. 6 is a side view of the example lamp assembly 160 with the example end effector 162 in the retracted position.

Like the lamp assembly 122, the lamp assembly 160 may include a first portion 164, a second portion 166, and a lamp housing 168. The end effector 162 may be attached to the first portion 164 of the lamp assembly 160 and may be positioned beside the second portion 166. The control module 102 is configured to actuate the end effector 162 between the extended position shown in FIG. 5 and the retracted position shown in FIG. 6.

In some examples, the panel 108 may move from a closed (first) position to an open (second) position to access another panel 108 or an interior portion of the same panel 108. While the end effector 162 is in the extended position, the control module 102 is configured to move the panel 108 from the closed position to the open position using the robot (e.g., the end effector 162). In one example, such as for a fuel door (a panel), the end effector 162 may be pressed against the panel 108 to move the panel 108 to the open position. In another example, such as for a liftgate (a panel), the end effector 162 may operate a control portion (e.g., a button or switch) of the panel 108 to move the panel 108 to the open position. The control module 102 is configured to operate the end effector 162 to move the panel 108 from the open position to the closed position.

The end effector 162 may include a rod 170 and a contact device 172 attached to the rod 170. The rod 170 may extend between a third end 174 and a fourth end 176 that opposes the third end 174. The contact device 172 may be attached to the fourth end 176 of the rod 170. In the illustrated example, the contact device 172 is shown as a suction cup. However, the contact device 172 may be another suitable type of contact device used to actuate and/or physically contact the panel 108 of the vehicle 110, such as a hook. When the end effector 162 is in the extended position, the rod 170 may extend from the first portion 164 such that both the third and fourth ends 174, 176 of the rod 170 are disposed outside the first portion 164. When the end effector 162 is in the retracted position, the rod 170 may be substantially retracted into the first portion 164 such that the third end 174 of the rod 170 is disposed within the first portion 164 and the contact device 172 is disposed outside the first portion 164.

Figure 9:
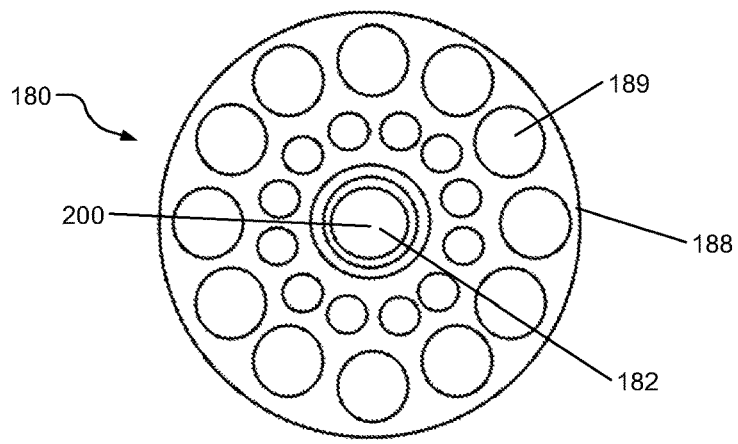
FIG. 9 is a bottom view of the example lamp assembly shown in FIGS. 7-8.

In some configurations of the lamp assembly having the end effector, an end effector may be attached to (e.g., within) a lamp housing of a lamp assembly. FIG. 7 is a side view of an example lamp assembly 180 with an example end effector 182 in an extended position. FIG. 8 is a side view of the example lamp assembly 180 shown in FIG. 7 with the example end effector 182 in a retracted position. FIG. 9 is a bottom view of the example lamp assembly 180 shown in FIGS. 7-8.

Like the lamp assemblies 122, 160, the lamp assembly 180 may include a first portion 184, a second portion 186, and a lamp housing 188 having UV lights 189. The end effector 182 may be attached to the lamp housing 188. The control module 102 is configured to move the end effector 182 between the extended position shown in FIG. 7 and the retracted position shown in FIG. 8, and configured to move the panel 108 between the open and closed positions using the end effector 182.

Like the end effector 162, the end effector 182 may include a rod 190 and a contact device 192 attached to the rod 190. The rod 190 may extend between a third end 194 and a fourth end 196 that opposes the third end 194. When the end effector 182 is in the extended position, the rod 190 may extend from the lamp housing 188 such that both the third and fourth ends 194, 196 of the rod 190 are disposed outside the lamp housing 188. When the end effector 182 is in the retracted position, the rod 190 may be retracted into the lamp assembly 180 such that the third end 194 of the rod 190 is disposed within the second portion 186 and the contact device 192 is disposed within the lamp housing 188.

In the illustrated example shown in FIG. 9, the end effector 182 may be positioned at a center 200 of the lamp housing 188 and the UV lights 189 may be disposed annularly around the end effector 182 and radially outwardly of the end effector 182. However, the end effector 182 may be positioned in another suitable location in or on the lamp housing 188.

Figure 10:
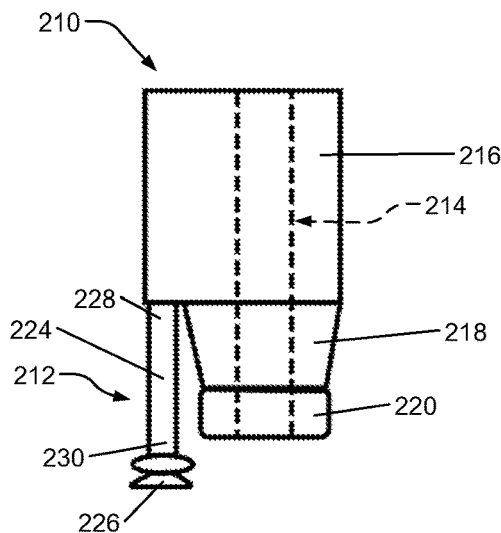
FIG. 10 is a side view of an example lamp assembly and an example end effector in an extended position.
Figure 11:
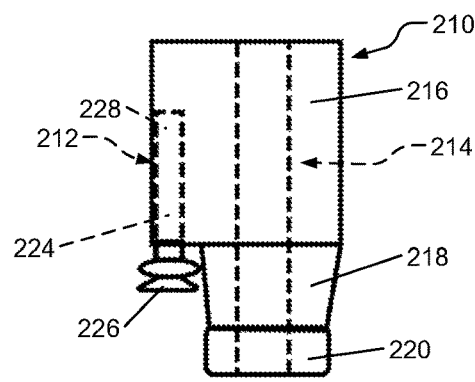
FIG. 11 is a side view of the example lamp assembly shown in FIG. 10 and the example end effector in a retracted position.
Figure 12:
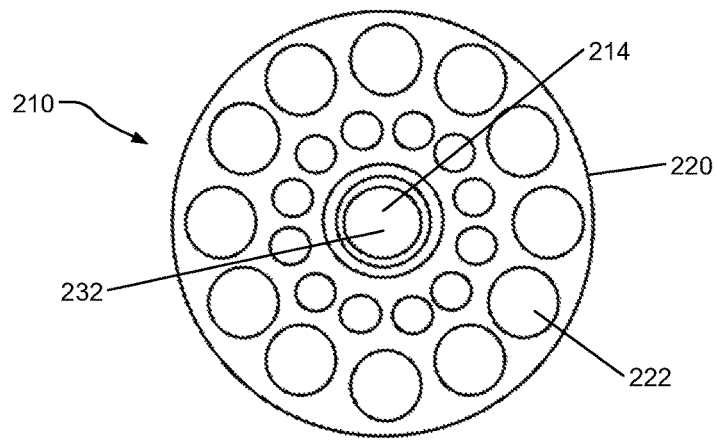
FIG. 12 is a bottom view of the example lamp assembly shown in FIGS. 10-11.

In some configurations of the lamp assembly, a lamp assembly may include a paint applicator. FIG. 10 is a side view of an example lamp assembly 210 with an example end effector 212 in an extended position and an example paint applicator 214. FIG. 11 is a side view of the example lamp assembly 210 shown in FIG. 10 with the example end effector 212 in a retracted position and the example paint applicator 214. FIG. 12 is a bottom view of the example lamp assembly 210 shown in FIGS. 10-11.

Like the lamp assemblies 122, 160, 180, the lamp assembly 210 may include a first portion 216, a second portion 218, and a lamp housing 220 having UV lights 222. The end effector 212 may be attached to the first portion 216 of the lamp assembly 210 and may be disposed beside the second portion 218. The control module 102 is configured to move the end effector 212 between the extended position shown in FIG. 10 and the retracted position shown in FIG. 11 and configured to move the panel 108 between the open and closed positions using the end effector 212.

Like the end effectors 162, 182, the end effector 212 may include a rod 224 and a contact device 226 attached to the rod 224. The rod 224 may extend between a third end 228 and a fourth end 230 that opposes the third end 228. When the end effector 212 is in the extended position, the rod 224 may extend from the first portion 216 such that both the third and fourth ends 228, 230 of the rod 224 are disposed outside the first portion 216. When the end effector 212 is in the retracted position, the rod 224 may be substantially retracted into the first portion 216 such that the third end 228 of the rod 224 is disposed within the first portion 216 and the contact device 226 is disposed outside the first portion 216.

The paint applicator 214 may be a high transfer efficiency paint applicator or another suitable type of paint applicator. The paint applicator 214 may be disposed within the lamp assembly 210. More specifically, the paint applicator 214 may extend through the first portion 216, second portion 218, and the lamp housing 220. In the illustrated example shown in FIG. 12, the paint applicator 214 may be positioned at a center 232 of the lamp housing 220 and the UV lights 222 may be disposed annularly around the end effector 212 and radially outward of the paint applicator 214. However, the paint applicator 214 may be positioned in another suitable location in or on the lamp housing 220.

The control module 102 is configured to actuate the paint applicator 214 to output paint onto the panel 108. After painting, the control module 102 is configured to turn on the UV lights 222 to cure the applied paint.

Figure 13:
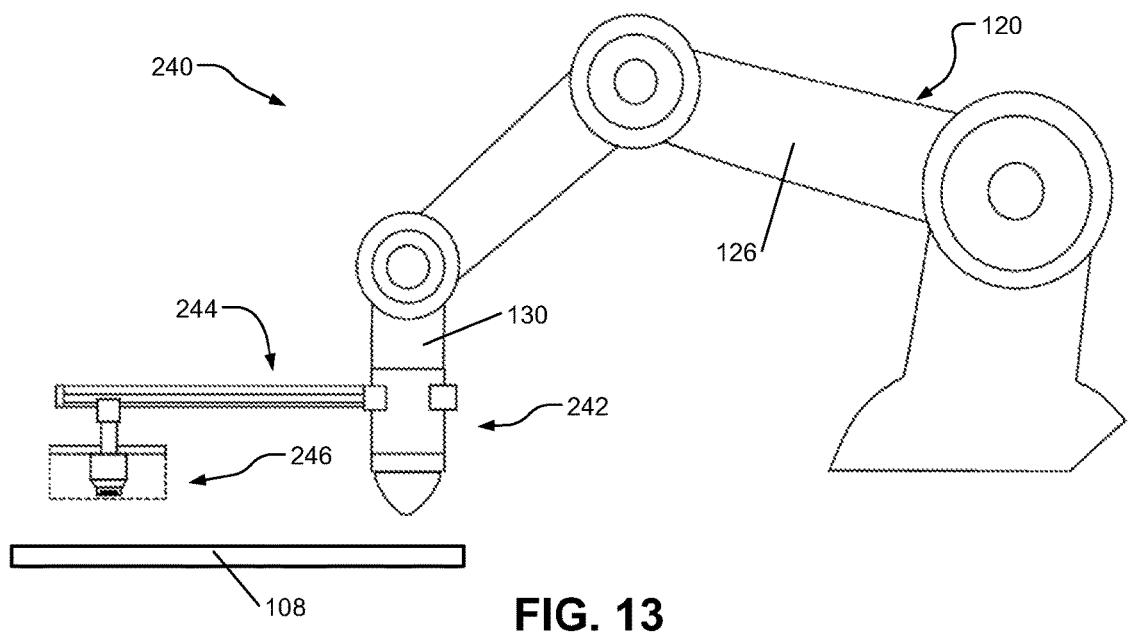
FIG. 13 is a side view of an example robotic system and an example panel of the vehicle.
Figure 14:
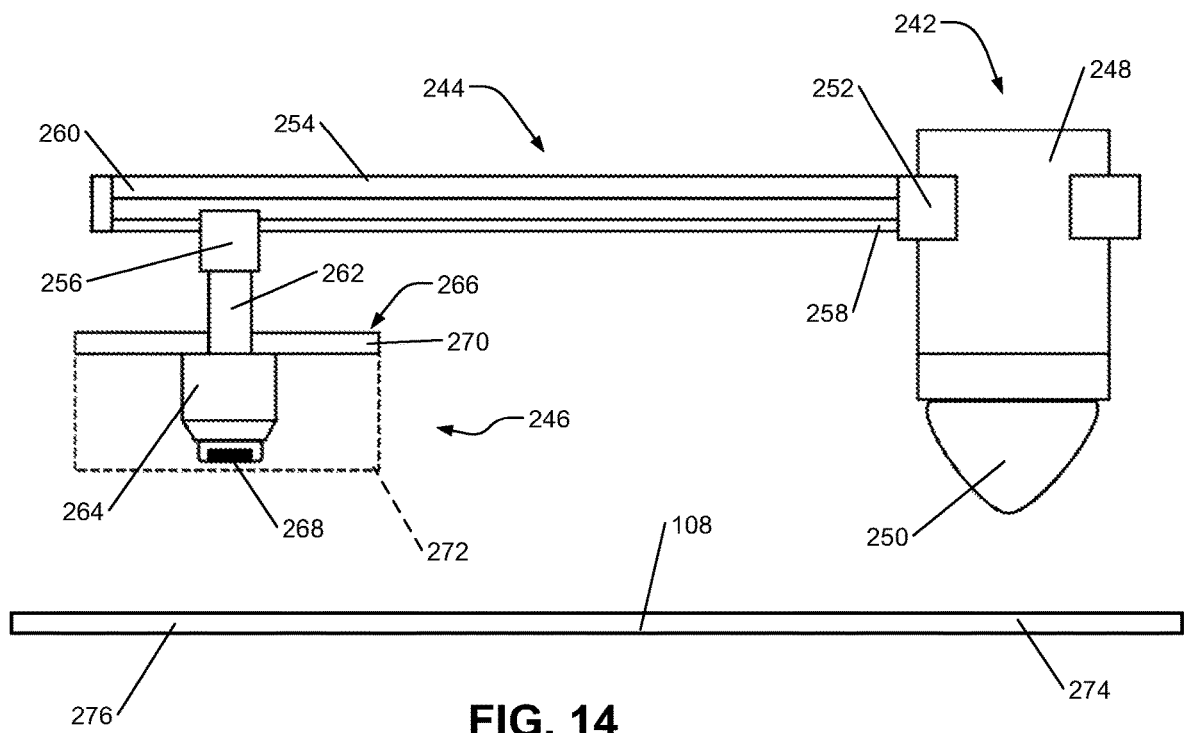
FIG. 14 is a side view of an example lamp assembly and an example paint applicator.

In some configurations of the robotic system, a paint applicator may be attached to a robot and a lamp assembly may be slidably attached to the paint applicator. FIG. 13 is a side view of an example robotic system 240 and the panel 108. FIG. 14 is a side view of an example paint applicator 242, a rail assembly 244, and an example lamp assembly 246 of the robotic system shown in FIG. 13.

The robotic system 240 may include the robot 120, the paint applicator 242, the rail assembly 244, and the lamp assembly 246. The paint applicator 242 may include a housing 248 and a nozzle 250 attached to the housing 248. The housing 248 is directly attached to the second end 130 of the robot arm 126. The nozzle 250 may be configured to output (e.g., spray) curable paint. In the illustrated example, the nozzle 250 may be formed in a cone shape. However, the nozzle 250 may be formed in another suitable shape. The paint applicator 242 may be a high transfer efficiency paint applicator or another suitable type of paint applicator.

The rail assembly 244 is attached to the paint applicator 242 using a sleeve 252 or another suitable type of attachment/connection device. The rail assembly 244 extends away from the housing 248 of the paint applicator 242. The rail assembly 244 may include a rail 254 and a slider 256. The rail 254 may extend between a fifth end 258 and a sixth end 260 that opposes the fifth end 258. The fifth end 258 of the rail 254 may be attached to the paint applicator 242. The sixth end 260 of the rail 254 may be positioned longitudinally away from the paint applicator 242. Thus, the rail 254 may extend in a substantially longitudinal direction. The slider 256 may be coupled to the rail 254 and may be slidable along the rail 254 between the fifth and sixth ends 258, 260 of the rail 254.

The lamp assembly 246 may be attached to the slider 256 of the rail assembly 244 such that the lamp assembly 246 is positioned adjacent to the paint applicator 242. The control module 102 is configured to move the lamp assembly 246 along the rail 254.

The lamp assembly 246 may include a connector 262, a lamp housing 264, and a lamp shield 266. The connector 262 attaches the slider 256 of the rail assembly 244 to the lamp housing 264. The lamp housing 264 may be the same or substantially similar to the lamp housings 136, 150. Specifically, the lamp housing 264 includes UV lights. The lamp housing 264 may additionally include a distance sensor 268. The distance sensor 268 is configured to measure a distance between the UV lights of the lamp housing 264 and the panel 108 of the vehicle 110.

The lamp shield 266 may include a lamp panel 270 and a lamp cover 272. The lamp panel 270 may be disposed on top of the lamp housing 264 and may extend outwardly from the lamp housing 264. In the illustrated example, the lamp panel 270 is formed into a circular shape. However, the lamp panel 270 may be formed in another suitable shape. The lamp cover 272 may extend from a perimeter of the lamp panel 270 such that the lamp cover 272 is disposed annularly around the lamp housing 264. The lamp cover 272 may be made of a yellow-dyed cellulose triacetate film, or any other suitable material.

The control module 102 may simultaneously activate the paint applicator 242 to output (e.g., spray) paint and turn on the UV lights of the lamp housing 264 to cure paint. For example, the paint applicator 242 may apply curable paint to a first portion 274 of the panel 108 while the UV light cures a second portion 276 of the panel 108 that has been already painted. The lamp cover 272 is positioned to restrict exposure of the UV light from the lamp assembly 246 to the first portion 274 of the panel 108 that is being painted to avoid premature curing.

The control module 102 is configured to move the lamp assembly 246 along the slider 256. In some examples, the lamp assembly 246 alternatively or additionally may be moved along the slider 256 manually by an operator. The control module 102 determines an off-set distance to move the lamp assembly 246 along the slider 256 based on a duration of time for the curable paint to settle before starting the curing process.

The control module 102 is configured to move the lamp assembly 246 relative to the slider 256. In the illustrated example, the connector 262 is configured to move in a substantially vertical direction, thereby moving the lamp housing 264 in a corresponding direction vertically upwardly and downwardly. Additionally, the lamp housing 264 may be configured to rock (e.g., pivot) relative to the connector 262. The lamp housing 264 may rock in another suitable direction. The control module 102 determines a movement of the lamp assembly 246 based on the distance from the distance sensor 268. More specifically, the control module 102 adjusts an output intensity of the UV lights and the distance from the distance sensor 268 in order to achieve a target intensity at the panel 108.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language $5^{th}$ revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robotic system comprising:
a robot arm including a first end and a second end that opposes the first end;
a paint applicator disposed at the second end of the robot arm and configured to output paint onto a panel of a vehicle;
a rail attached to the paint applicator and extending away from the paint applicator; and
a lamp assembly configured to slide along the rail and that includes at least one UV light operable to cure paint on the panel of the vehicle; and
a control module configured to actuate the robot arm and position the paint applicator relative to the panel of the vehicle and position the lamp assembly relative to the panel of the vehicle.

2. The robotic system of claim 1, wherein the control module is configured to slide the lamp assembly along the rail.

3. The robotic system of claim 1, wherein the control module is configured to pivot the lamp assembly relative to the rail.

4. The robotic system of claim 1, wherein the control module is configured to selectively move the lamp assembly toward the rail and away from the rail.

5. The robotic system of claim 1, wherein the lamp assembly includes a distance sensor configured to measure a distance between the lamp assembly and the panel of the vehicle.

6. The robotic system of claim 5, wherein the control module is configured to move the lamp assembly one of toward the rail and away from the rail based on the distance measured by the distance sensor.

7. The robotic system of claim 1, wherein the lamp assembly includes a lamp cover disposed annularly around the at least one UV light.

8. The robotic system of claim 1, wherein the at least one UV light includes a plurality of UV lights having a same wavelength.

9. The robotic system of claim 1, wherein the at least one UV light includes a plurality of UV lights having more than one different wavelength.

* * * * *